May 11, 1926.  1,584,187
F. A. MONROE
OIL WELL CLEANING APPARATUS
Filed July 1, 1924    2 Sheets-Sheet 1
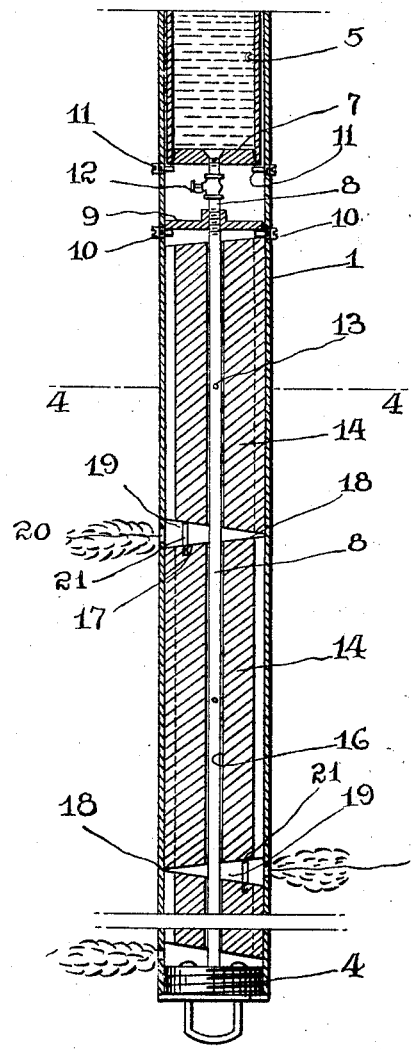
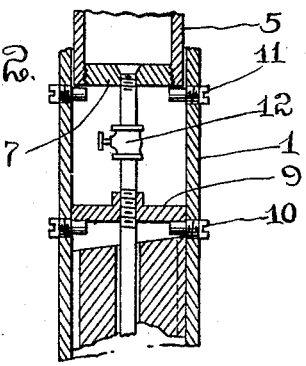
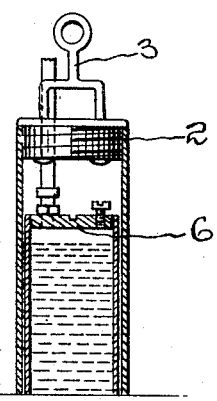
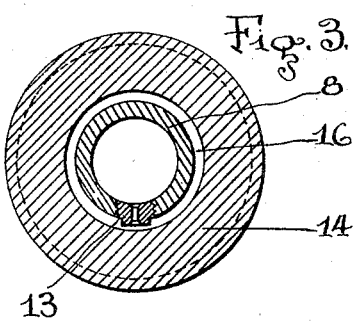
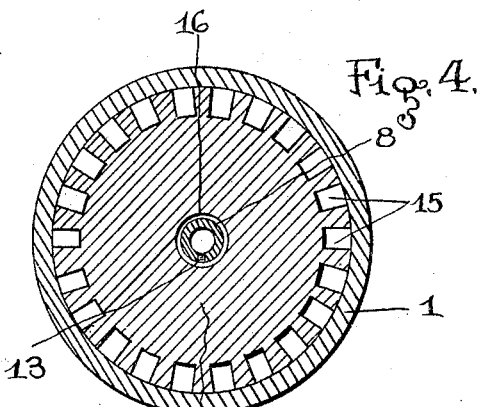
INVENTOR
Frank A. Monroe.
BY
Ashby & Ashby
his ATTORNEYS

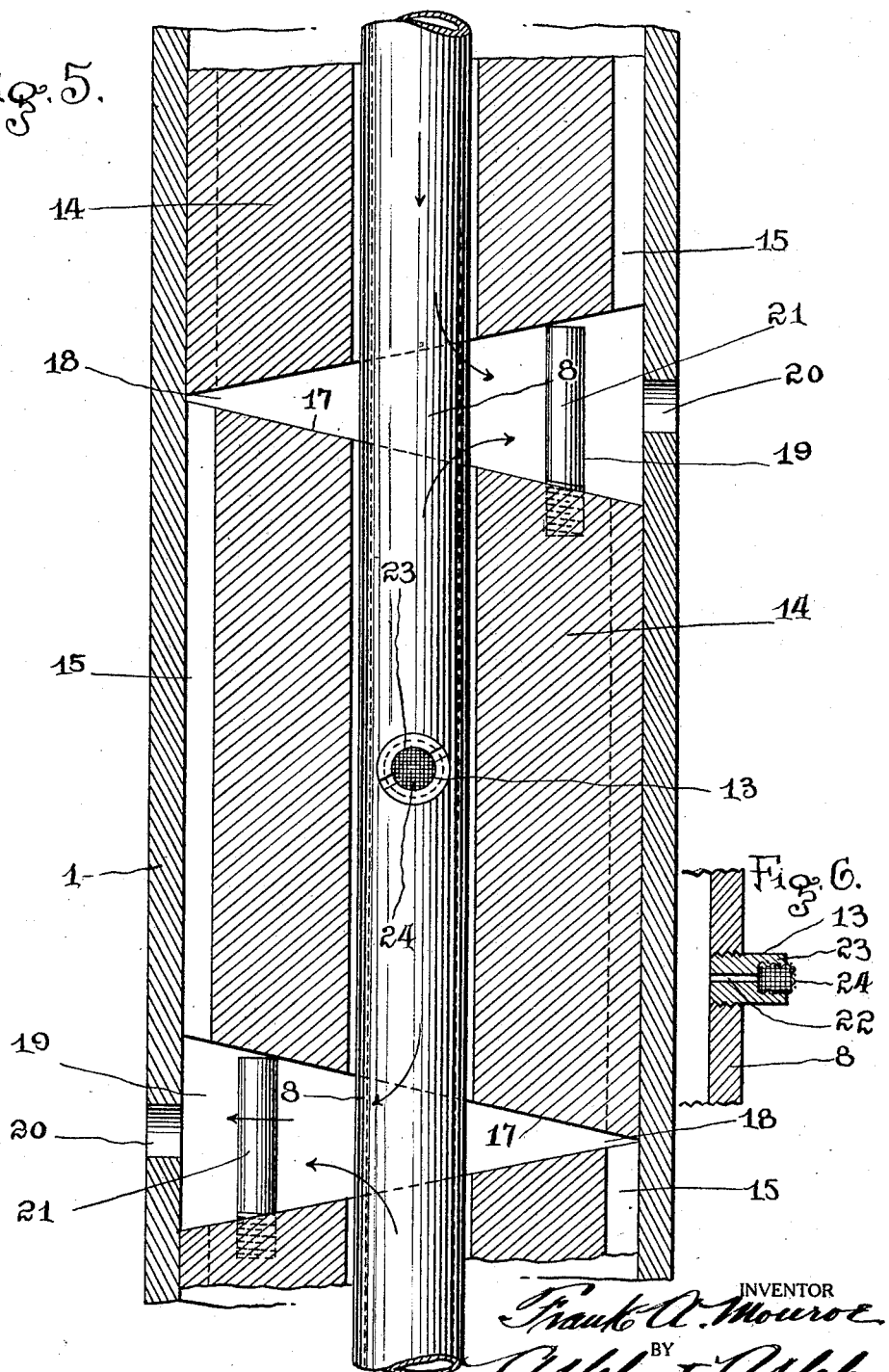

Patented May 11, 1926.

1,584,187

UNITED STATES PATENT OFFICE.

FRANK A. MONROE, OF JAMESTOWN, NEW YORK, ASSIGNOR, BY MESNE ASSIGNMENTS, TO THE INCREASE ENGINEERING SYSTEM, A COMMON-LAW TRUST ESTATE.

OIL-WELL-CLEANING APPARATUS.

Application filed July 1, 1924. Serial No. 723,496.

The invention relates to improvements in oil well cleaning apparatus and has particular reference to a device or structure having associated therewith a series of heat retaining units and a reservoir adapted to be lowered through the casing of an oil well to the bottom thereof, at which point the water from said reservoir is permitted to flow through a suitable water pipe connection whence said water is impinged upon said heat retaining units to generate steam to increase the flow of oil from said oil well.

The object of the invention is the providing of a receptacle or casing having mounted in its upper end a cap by which said casing is supported, and a closing plug at its lower end mounted therein to permit of the insertion within said casing of a plurality of metal billets that are primarily heated to a red heat before the insertion of the same within said casing, and a water reservoir mounted in said casing having associated therewith a depending pipe, provided with a series of water ejector nozzles positioned within said pipe adjacent said billets, and a valve interposed in said pipe for controlling the flow of water from the reservoir into said pipe in order to provide a steam producing apparatus wherein the heating surface is greater and whereby a heavier head of steam is generated to be thereafter deflected through said casing into the oil well to increase thereby the production of said oil well and facilitate the flow of the oil therefrom. A further object of the invention is in the adaptation of the apparatus for removing asphalt, paraffin, and other by-products of producing oil wells.

In the following I have described one embodiment of the invention, the features thereof being more particularly pointed out hereinafter in the claims.

In the drawings, Fig. 1 is a vertical sectional view of the oil well cleaning apparatus; Fig. 2 is a vertical sectional view in detail of the supporting casing and the apparatus for controlling the flow of the water from the reservoir to the heat retaining units; Fig. 3 is a cross-sectional view of one type or form of billet and the water supply pipe therefor, illustrating the relative positions of said billets and water supply pipe; Fig. 4 is a cross-sectional view on the line 4—4 of Fig. 1, illustrating the channelled periphery of one of the heating billets, showing the increased heating surface area of same; Fig. 5 is an enlarged vertical sectional view in detail of the supporting casing and the heat retaining billets, each thereof being provided at their ends with diagonal surfaces so as to provide there-between conical shaped chambers into which the steam passes, after the water from the water supply pipe is impinged against said heat retaining billets and from which chambers said steam passes from suitable apertures in said casing to the inner confines of the producing area or oil-sands of the well; and Fig. 6 is a detail vertical sectional view of the water supply pipe, illustrating the spray nipple as provided with a strainer means to prevent the passage of grit and foreign subtances therefrom against the heating billets.

Similar numerals of reference indicate similar parts throughout the several views.

In the drawings, (1) designates a tubular supporting casing that may be of any desired length and of any desired diameter for insertion into the casing of an oil well, and has mounted in its upper end a cap (2) provided with a shackle arm (3) to which a rope, wire or other means is attached to lower same within the said casing of an oil well, and at its lower end with a plug (4), arranged for removal therefrom so as to permit of the insertion therein of any desired number of heat retaining slugs or billets.

The upper portion of said casing (1) has mounted therein a water reservoir (5) provided with a removable cap (6) at its upper end and a base plug (7) into which is secured a water supply pipe (8). Said pipe (8) is mounted in a supporting cap (9) which is retained in place in casing (1) by means of pins (10). Said water reservoir (5) is controlled by means of an automatic or hand controlled valve (12).

The water supply pipe (8) extends from plug (7) to reservoir (5) downwardly and is held in position at its lower end by means of said plug (4) and has mounted therein a plurality of spray nozzles (13) positioned in said pipe (8) in such a manner as to dispose same permanently in the center of each of the respective billets (14) which may be made of cast iron or any other suitable heat retaining metal, and which have their peripheries thereof channelled as at (15) to increase the heat retaining surface area of same. The said billets (14) have centrally formed therein an aperture of greater diameter than the diameter of pipe (8) so as to provide a chamber (16), and the respective ends of said billets (14) are formed with a diagonal tapering surface (17) so that each respective billet thereof engages as at (18), and by reason of the diagonal ends thereof form there-between steam chambers (19) into which the steam passes, and from which the steam generated by the water flowing upon or being impinged upon said billets (14), passes through apertures (20) into the inner confines of the producing area of an oil well, or in case the producing sands are compact and settled, to cause said steam to permeate said oil sands, heating the producing area thereof to an extent whereby the production of said oil well is increased in varying ratios over its original production. Said billets (14) are held in their respective positions in casing (1) to provide the steam chambers (19) by means of spacing pins (21) mounted in one end of each billet and engaging the one adjacent thereto, and said spray nozzles (13) are provided with small water ducts (22) forming a passageway to chamber (23) having mounted therein a strainer gauze (24) arranged to prevent the passage therethrough of grit, dirt, and other foreign substances. This latter prevents the fouling of the heat retaining billets (14) and the clogging of the water ducts. Cap (6) has mounted therein a hose or pipe connection (25) arranged to be connected up with a compressed air supply for producing a pressure upon the water column to force the water from reservoir (5) into pipe (8) thence through spray nozzles (13) to said heating billets (14).

It is obvious that by reason of forming the heat retaining units in the manner as described that the steam producing capacity of the cleaning apparatus is greatly increased and that owing therefore to the increased heat producing area of each unit thereof the apparatus will greatly enhance the operativeness of the structure as is shown and described, and that it may be varied in many of its structural features without materially departing from the general spirit and trend of the invention.

What is claimed and desired to be secured by Letters Patent of the United States is:

1. A device of the character described comprising a supporting casing, enclosure caps mounted in the respective ends thereof, a water reservoir mounted therein, a water supply pipe connected with said water reservoir and extending to the lower ends of said supporting casing, a plurality of nozzles mounted in said water supply pipe, a plurality of heat retaining billets mounted in said supporting casing each thereof having its ends cut on a diagonal plane to form between each of the engaging billets, a conical steam reception chamber, apertures in said casing through which the steam generated in said casing passes, and a plurality of channels or serrations formed in the periphery of each of said heat retaining units to increase the respective heating surface areas thereof.

2. A device of the character described including a cleaner head for oil wells comprising a closed reception chamber provided with a series of apertures, a water reservoir mounted therein, a series of heated billets mounted in said reception chamber, a water pipe connection forming a supply means between said reception chamber and said water reservoir, apertures in said pipe connection arranged to permit water to pass therefrom to impinge upon said heated billets to generate a head of steam, and chambers formed between the ends of said billets to receive said head of steam to cause same to pass from said closed chambers into the inner recesses of a well head.

3. A device of the character described including a heat retaining billet comprising a metallic body having its periphery serrated to increase the heating surface area thereof and having its respective ends thereof formed with diagonally inclined and tapered faces arranged to form between the abutting ends of like or adjacent billets steam chambers for the purposes specified.

In testimony whereof, I, FRANK A. MONROE, have signed my name to this specification, this 31st day of May, 1924.

FRANK A. MONROE.